United States Patent
Don et al.

(10) Patent No.: US 6,324,604 B1
(45) Date of Patent: Nov. 27, 2001

(54) MAGNETIC DISK STORAGE FOR STORING DATA IN DISK BLOCK SIZE FROM FIXED LENGTH OF HOST BLOCK IN NON-INTEGER MULTIPLE OF THE DISK BLOCK SIZE

(75) Inventors: Arieh Don, Brookline; Erez Ofer, Chestnut Hill; Natan Vishlitzky, Brookline, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/111,211

(22) Filed: Jul. 7, 1998

(51) Int. Cl.[7] ................ G06F 3/06; G06F 13/14
(52) U.S. Cl. ................ 710/74; 710/52; 710/65; 360/48; 711/111
(58) Field of Search ................ 710/52, 74, 65, 710/66; 360/48; 711/111, 126

(56) References Cited

U.S. PATENT DOCUMENTS

| | | | |
|---|---|---|---|
| 5,301,304 | 4/1994 | Menon | 395/500 |
| 5,459,850 | 10/1995 | Clay et al. | 395/497.02 |
| 5,500,848 | 3/1996 | Best et al. | 369/275.03 |
| 5,581,743 | 12/1996 | Burton et al. | 395/500 |
| 5,590,311 | 12/1996 | Natsushima | 395/500 |
| 5,606,529 | * 2/1997 | Honma et al. | 365/230.03 |
| 5,617,432 | 4/1997 | Eggenberger et al. | 371/37.1 |
| 5,717,956 | 2/1998 | Shinosaka et al. | 395/885 |
| 5,734,859 | * 3/1998 | Yorimitsu et al. | 711/112 |

FOREIGN PATENT DOCUMENTS 0738954   10/1996   (EP) .

* cited by examiner

Primary Examiner—Thomas Lee
Assistant Examiner—Ilwoo Park
(74) Attorney, Agent, or Firm—George A. Herbster; Pearson & Pearson (57) ABSTRACT

A method and apparatus for enabling a magnetic disk storage device that stores data according to a first data structure characterized by a fixed-length disk block size to respond to input/output requests from a host that define data according to a different data structure characterized by a different fixed-length host block size. A host adapter transfers requests and data between the host and a cache memory in the magnetic disk storage device as host blocks. A disk adapter transfers requests and data between the cache memory and magnetic disks as disk blocks. CRC data and a sector number are appended to each host block in a set of disk blocks.

26 Claims, 6 Drawing Sheets

MAGNETIC DISK STORAGE FOR STORING DATA IN DISK BLOCK SIZE FROM FIXED LENGTH OF HOST BLOCK IN NON-INTEGER MULTIPLE OF THE DISK BLOCK SIZE

BACKGROUND OF THE INVENTION

1. Field of the Invention

This invention relates generally to data processing systems and more particularly to magnetic media storage systems used in such data processing systems.

2. Description of Related Art

Many data processing systems include one or more central processors and one or more magnetic media storage systems. Typically, the magnetic medium comprises either a magnetic disk or a magnetic tape. Magnetic disk media storage systems, particularly, have been developed for use with particular machines according to particular data structures or formats. IBM mainframe computers constitute one such machine. UNIX-based or open systems constitute machines characterized by another diverse data structure.

For purposes of understanding this invention, one such characteristic is the relationships among a drive, the number of cylinders on a drive, the number of tracks in a cylinder, number of sectors in a track, the number of data blocks in a sector and the number of bytes in a data block. For example, Unix computers and the like operate with a data structure in which a data block comprises 512 bytes. Certain disk storage systems for Unix-based data processing systems, such as those supplied by the assignee of this invention, further arrange eight data blocks into one sector and eight sectors into one track.

Other computer systems exist that utilize host processors for operation with other, diverse data structures in which block sizes contain a different number of bytes. As one example, a host may operate with 2,088 bytes in a block. However, the market for magnetic disk storage devices for such data processing systems is limited, and the costs of adding such storage systems that are specifically designed for such data structures can be prohibitive. Likewise, rewriting applications to conform to another data structure is also prohibitive.

One might consider reformatting a standard device with the data structures characteristic of the host system. However, it has been found that this is difficult or impossible to accomplish primarily because magnetic disk storage devices themselves, even at the most basic levels, have been designed around standard data structures and can not be adapted to non-standard structures. Consequently, there has been no approach for integrating such standard magnetic disk storage systems into such non-standard data processing systems in a way that is transparent to input/output requests from a host with diverse data structures. However, as storage requirements increase, the demand for additional magnetic disk storage that operates with such hosts also increases.

SUMMARY

Therefore it is an object of this invention to provide a method and apparatus whereby a disk having a first data format can operate with a host characterized by a diverse data structure.

Still another object of this invention is to provide a method and apparatus whereby a disk having a first data structure can operate with a host in which applications programs operate with a second, different data structure.

Still another object of this invention is to provide a method whereby a disk having a first data structure can operate with hosts characterized by diverse host data structures in a manner that is transparent to any application program on any host.

In accordance with this invention input/output requests are processed in data processing system including a data storage device that stores data in fixed-length disk data blocks of a first plurality of data bytes and wherein a host generates input/output requests using fixed-length host blocks of a second plurality of data bytes. A buffer, intermediate the host and the data storage device has a size that exceeds the size of the larger of the host and disk data blocks. Data transfers between the host and the buffer occur in blocks corresponding to the size of the host data blocks. Data transfers between the data storage device and the buffer occur in blocks corresponding to the size of the disk data blocks.

In accordance with another aspect of this invention a data processing system includes a magnetic disk storage device having a characteristic fixed-length disk block size and includes a host that issues input/output requests including references to fixed-length host blocks of a larger size. A buffer is defined in a cache memory that has a size that is at least the size of the host block for storing an integer number of disk blocks whereby a set of the disk blocks is capable of storing a host block. A host adapter, that is connected between the host and cache memory, processes input/output requests from the host by transferring data between the host and the buffer in host blocks. A disk adapter connected between a magnetic disk storage device and the cache memory processes input/output requests in the buffer by transferring corresponding sets of disk blocks between the buffer and the magnetic disk storage device.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
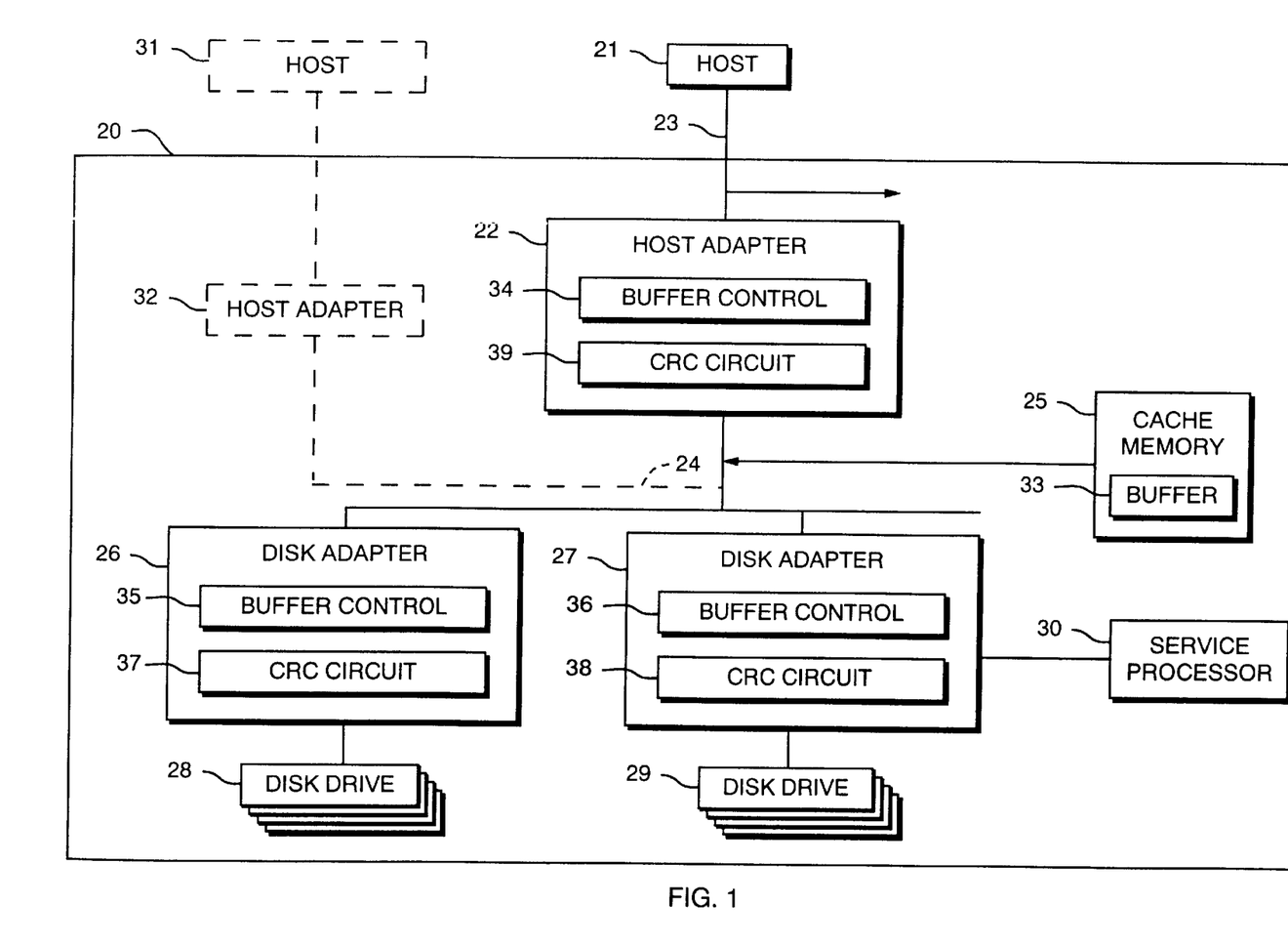
FIG. 1 is a block diagram of a data processing system incorporating this invention.

There are a variety of magnetic disk storage systems that are useful in connection with this invention. The following describes a magnetic disk storage system 20 in terms of the architecture of a Symmetrix Series 5000 magnetic disk storage system available from the assignee of the present invention that connects to a host 21. In this system, host adapters, like the host adapter 22, connect to the host 21 through a bus 23. The architecture of the host 21 typically defines the signals on the bus 23. The host adapter 22, as one function, converts the signals on an internal bus 24 that connects to other components such as a cache memory 25 and disk adapters 26 and 27. The host adapter 22 can connect to multiple hosts, and a host can connect to multiple host adapters.

In the Symmetrix system the cache memory 25 receives all requests for access to data on the magnetic disk storage memory 20 from any hosts connected to a host adapter 22 like the host 21 or from other hosts and host adapters. The cache memory 25 contains control information and data stored in various locations. The control information includes configuration and other information that enables a transfer request to be routed to an appropriate location.

Still referring to FIG. 1, the disk adapter 26 connects to a plurality of physical disk drives 28; the device controller 27, to a plurality of physical disk drives 29. A service processor 30, typically implemented with a small computer, or PC, controls the configuration and other attributes of the magnetic disk storage system 20.

FIG. 1 also depicts a second, or optional, host 31 that connects through another host adapter 32 to the magnetic disk storage system 20. For purposes of understanding this invention it is assumed that the host 31 operates with the same data structures as the magnetic disk storage system 20 and that the host 21 operates with a different data structure as described later.

As known, when a host, such as the host 31, issues a READ request, the controls associated with the magnetic disk storage system 20 first determine whether the data is in the cache memory 25. If it is, the data transfers directly to the host 31. Consequently there is no access to the disk drives 28 or 29. If the data is not available, the data is retrieved from the appropriate ones of the disk drives 28 and 29 into the cache memory 25 and then to the host 31. When a host, such as the host 31, issues a WRITE request, the data initially transfers to the cache memory 25 where the request is staged to be transferred to a designated location in one of the disk drives 28 and 29 through a corresponding one of the disk adapters 26 and 27.

This invention will be more readily understood by referring to two specific examples of diverse data structures. The first data structure is one for which the magnetic disk storage system 20 is designed to operate and is the data structure native to the host 31. For a Unix system, a Unix FBA structure has 512 bytes in a block.

Implementing this invention will allow the same data magnetic disk storage system 20 to operate either with the host 31 in concert with a host 21 or with the host 21 alone, even though the host 21 has a diverse data structure, such as a structure in which 2,088 data bytes constitute a data block.

This invention enables this capability to exist with minimal changes to a conventional disk memory storage device. As a result, even though the magnetic disk storage system 20 is designed to operate with the first, or disk, data structure, it will respond to I/O requests 21 of a second data structure, such as those that are native to the host 21. Each similar characteristic related to the two diverse data structures is distinguished in the following discussion by prefacing the characteristic by "host" when related to the host system and with "disk" when related to the data structure on the disk. Using this syntax and the specific data structures described earlier, a "host block" comprises 2,088 bytes; a "disk block" 512 bytes.

The modifications to the magnetic disk storage system 20 for enabling this operating capability include the addition of a buffer control circuit or module 34 in the host adapter 22. The cache memory contains a buffer 33 that is intermediate the host 21 and the data storage device constituted by the disks 28 and 29. The buffer control 34 establishes procedures by which the host adapter 22 transfers data between the host 21 and the cache memory 25 as host blocks. Buffer controls 35 and 36 are added to the disk adapters 26 and 27 respectively. The buffer controls 35 and 36 define the procedures by which transfers occur between the disk drives 28 and 29 and the cache memory 25 as disk blocks.

The magnetic disk storage system 20 typically provides data integrity checking, typically using a CRC protocol. FIG. 1 depicts CRC circuits 37 and 38 in the disk adapters 26 and 27, respectively, and a CRC circuit 39 in the host adapter 22.

Figure 2:
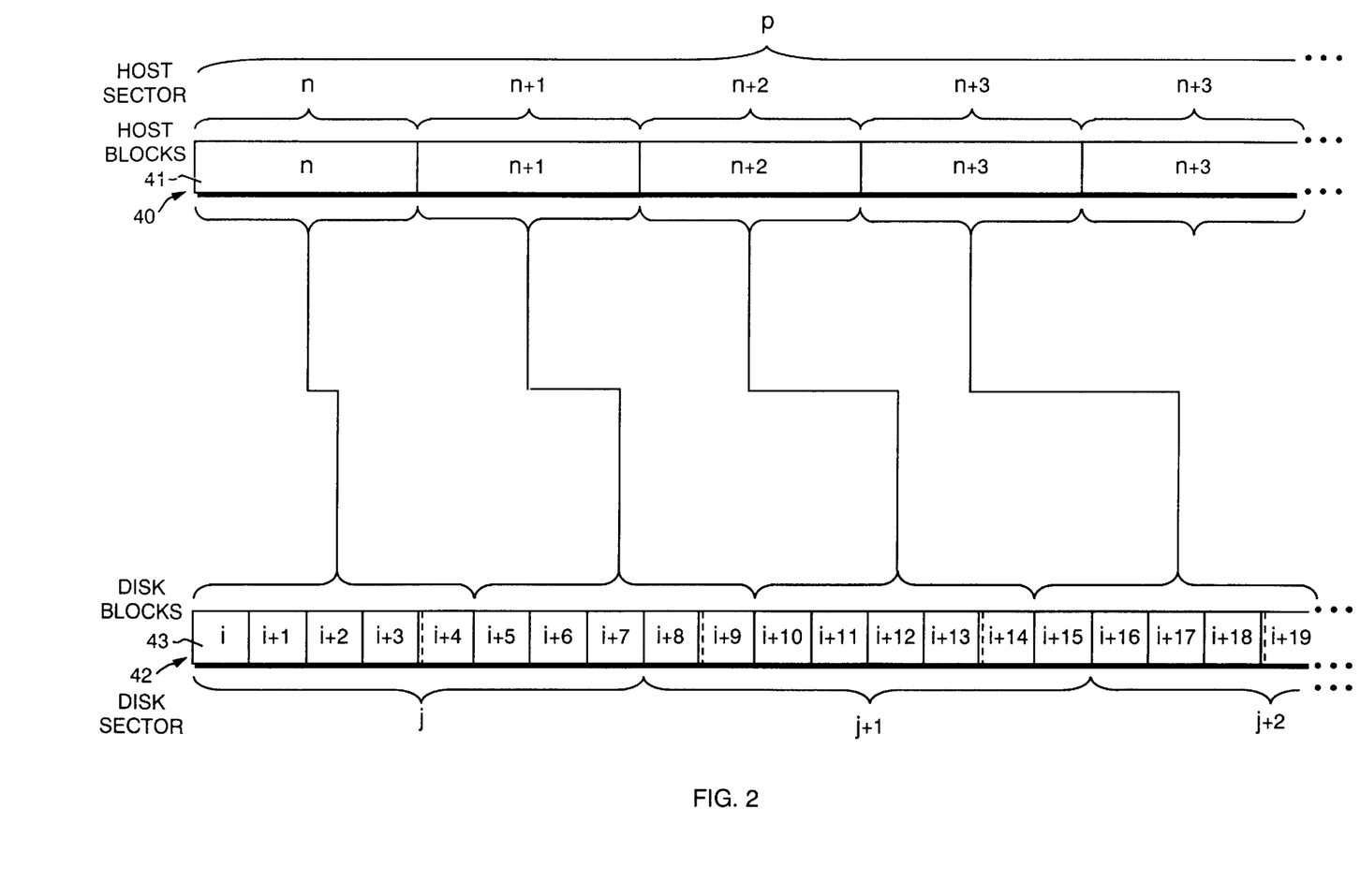
FIG. 2 depicts the relationship between different data structures used in the system shown in FIG. 1.

As previously indicated, each host operates with a predetermined host block size. FIG. 2 illustrates one such relationship by depicting a plurality of host blocks 40 designated as host blocks n through n+3. Each host block n, designated by reference numeral 41, comprises 2,088 bytes. In addition, as previously indicated, each host block constitutes a host sector so each host block n corresponds to a host sector n.

This data in magnetic disk storage system 20 in FIG. 1 is organized into a plurality of disk blocks i, i+1, . . . . In an embodiment of the invention available from the assignee of this invention consecutive disk blocks i through i+7 constitute a disk sector j, and FIG. 2 depicts a plurality of sectors that would be located on a single track. As previously indicated, each disk block, such as disk block i, identified further by reference numeral 43, is a fixed-length block of 512 bytes.

In accordance with this invention an integer number of disk blocks are grouped together in disk block sets. Generally the number is determined by dividing the host block size by the disk block size and rounding the quotient to the next higher integer number. In this particular example, a disk block set comprises five consecutive disk blocks. Each set then is assigned to a host block. Consequently, and as shown in FIG. 2, a relationship between host blocks and disk blocks is established as follows:

| HOST BLOCK | DISK BLOCKS | |
| --- | --- | --- |
| | STARTING | ENDING |
| n | i | i + 4 |
| n + 1 | i + 5 | i + 9 |
| n + 2 | i + 10 | i + 14 |
| n + 3 | i + 15 | i + 19 |
| n + 4 | i + 20 | i + 24 |

As will be apparent from the embodiment of FIG. 2, each host block fully populates four disk blocks and partially populates a fifth disk block, so the fifth disk block in each set has additional storage capacity. As previously indicated, the host adapter 22 includes a CRC circuit 39. In accordance with another aspect of this invention this circuit generates a CRC code for each host block, and this CRC code is appended to the data in the additional storage space available in fifth disk block of a set during any writing operation. Consequently the CRC code for each block is stored on the disk drive with the data.

Figure 3:
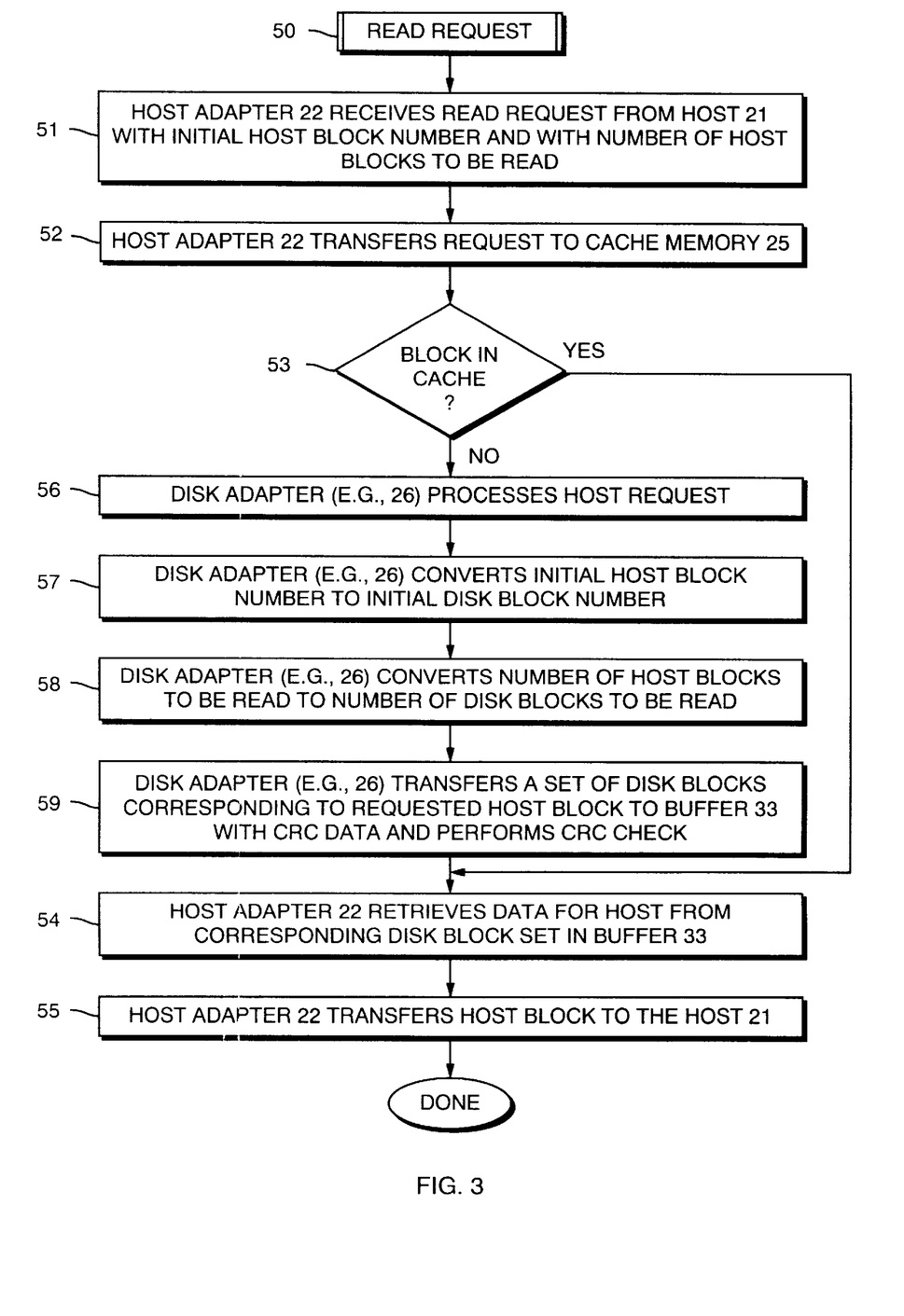
FIG. 3 is a flow chart of a read request that constitutes one input/output request used in FIG. 1.

Now referring to the operation of the buffer control 34 in the host adapter 22 and buffer controls 35 and 36 in disk adapters 26 and 27, each buffer control has a somewhat different operation with respect to READ and WRITE input/output requests. FIG. 3 depicts a procedure 50 that defines the operation in response to a READ input/output request or "READ" request. The host adapter 22 receives the read request from the host 21 with (1) an initial host block number and (2) the number of host blocks to be read in response to the request in step 51. The host adapter transfers this request to the cache memory 25 in step 52. If the data is in cache, step 53 diverts control to step 54 and the host adapter 22 is enabled to transfer the corresponding host block to the host 21.

If the requested host block is not in the cache memory 25, step 53 shifts control to step 56 whereupon a designated disk adapter, such as the disk adapter 26, processes the read request from the host. In step 57 the designated disk adapter converts an initial host block number to an initial disk block number. In step 58 the designated disk adapter performs a similar function to convert the number of host blocks to be read to a number of disk blocks to be read. In this particular application it will be apparent that these numbers normally can be obtained merely by multiplying the host block number by five. In step 59 the designated disk adapter then transfers a set of disk blocks corresponding the requested host block to the buffer 33 together with the CRC data included with the corresponding set of disk blocks. The CRC circuit, such as CRC circuit 37 in disk adapter 26, performs a CRC check for data integrity. Once the data is in the buffer 33, the host adapter 22 uses step 54 to retrieve the data from the corresponding disk block set in the buffer 33 and to transfer that data, stripped of any CRC data, as a host block to the host 21.

From this set of operations two advantages of this invention will be apparent. First, the response to the read request is the same for the host 21 in FIG. 1 as it would be for the host 31 having the same data structure as is inherent in the magnetic disk storage system 20. Second, the conversion between the host block numbers and disk block numbers occurs within the disk adapters, such as the disk adapters 26 and 27. These operations and the formation of the buffer 33 having the capacity to hold an entire host block (i.e., five disk blocks in this particular example) are transparent to the application as is the operation of the buffer control in the host adapter 22.

This description assumes that the magnetic disk storage system 20 operates only with a host 21. If the magnetic disk storage system 20 is connected to hosts with different data structures, such as the hosts 21 and 31 in FIG. 1, the operation of FIG. 3 can be modified to include a decision block between steps 53 and 56. This decision would be based upon the data structures. If the request were from a host having the same data structures as host 21, control would pass to step 56; otherwise control would pass to a conventional response to a read request.

Figure 4:
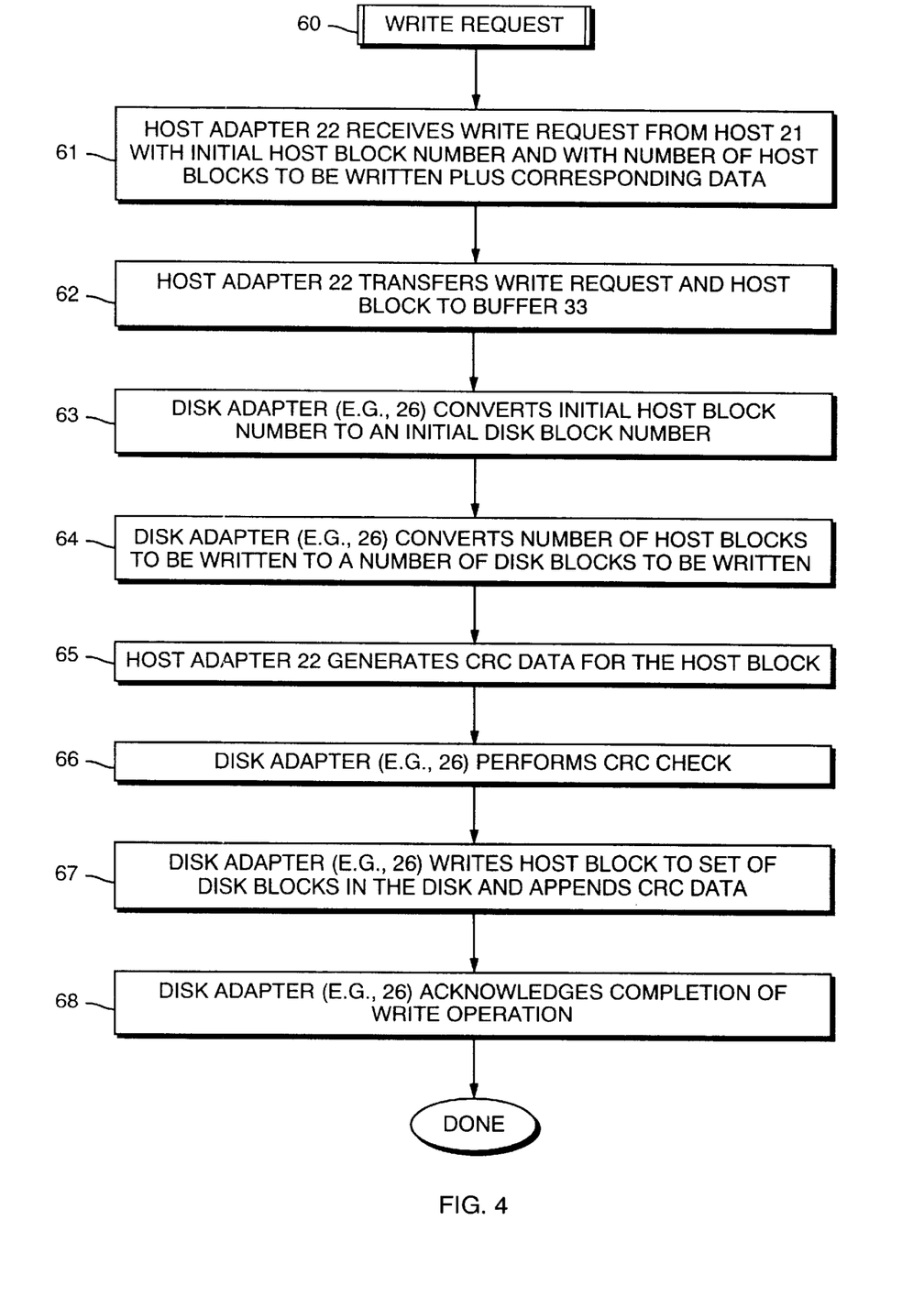
FIG. 4 is a flow chart of a write request that constitutes another input/output request used in FIG. 1.

A WRITE request from the host 21 initiates a procedure 60 in FIG. 4. In step 61 the host adapter 22 receives the WRITE request including the data to be stored from the host 21. This request will include an initial host block number and the number of host blocks to be written. In step 62 the buffer control 34 transfers the WRITE request to the cache memory 25 and the corresponding host block to the buffer 33. At the same time the host adapter 22 is notified that the writing operation has been completed. The disk adapter, such as the disk adapter 26, then converts the initial host block number to an initial disk block number in step 63 and converts the number of host blocks to be written to a number of disk blocks to be written in step 64. In step 65 the CRC circuit 39 generates the CRC data that is appended to the host block. That information transfers to the disk adapters, such as the disk adapter 26, where the CRC circuit 37 performs a CRC check on the host block in step 66 and then writes the host block to a set of disk blocks in the disk with the appended CRC data in step 67. After this is completed in step 68 the disk adapter acknowledges completion of the write operation to the host adapter.

As was true with the READ request, the magnetic disk storage system 20, shown in FIG. 1 handles the WRITE request in essentially the same way as any other WRITE request is handled conventionally except for the conversion of host block numbers to disk block numbers. The use of the added area to the last of a set of data blocks provides the advantage of allowing the disk to store CRC data for each data block. Consequently, a CRC circuit, such as the CRC circuit 37 in disk adapter 26, runs a check on the data, but does not undertake an extra step of calculating CRC data as would otherwise be required. Likewise, the CRC circuit 39 in the host adapter 22 can monitor the CRC data as a check prior to transferring a host block back to the host 21.

Figure 5:
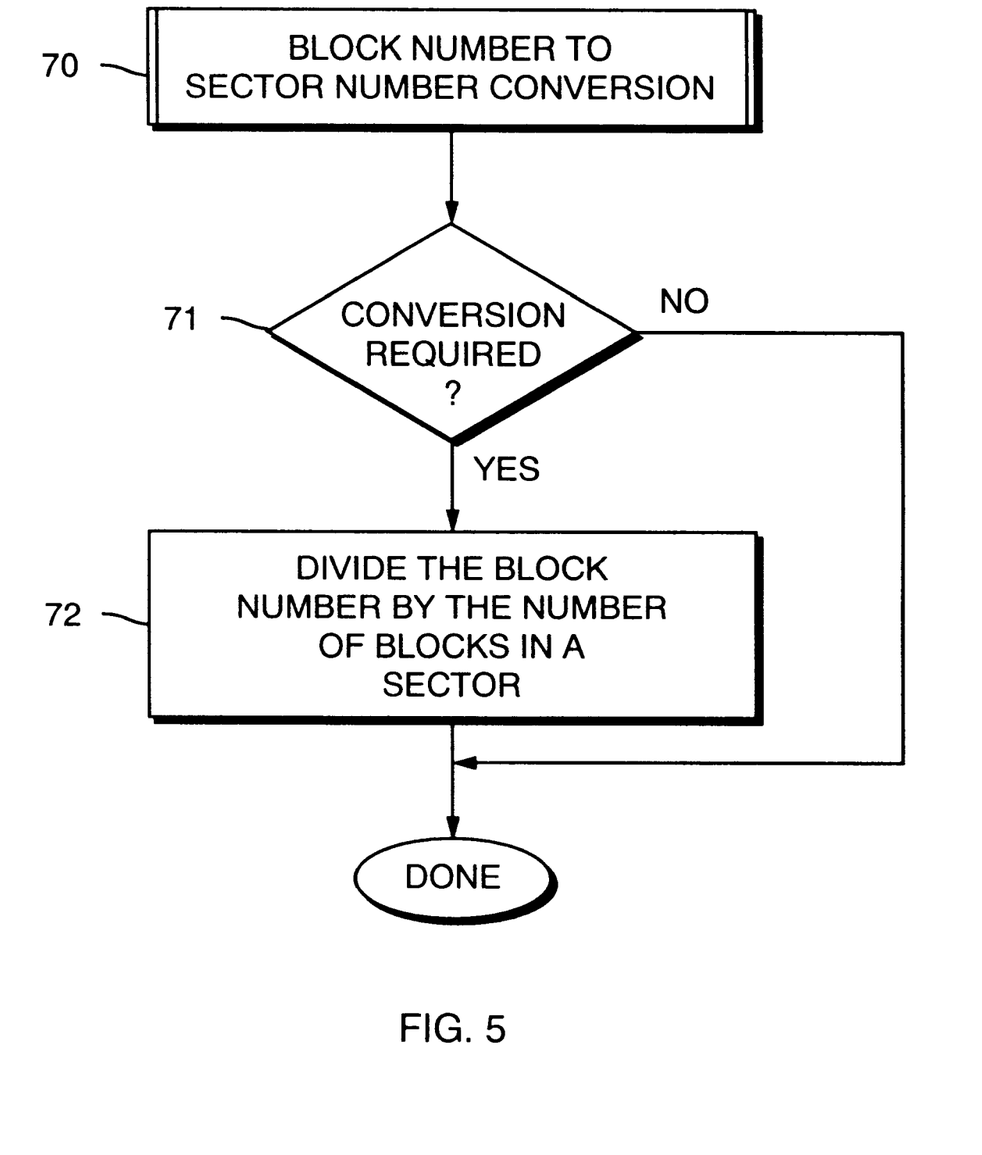
FIG. 5 is a flow diagram depicting a conversion from a host block number to a disk sector number.

Certain magnetic disk storage systems 20, such as the Symmetrix 5000 series offered by the assignee of this invention incorporate a disk sector number in the CRC portion of the system. When this occurs it is necessary to convert between block numbers and sector numbers, particularly between disk block and sector numbers. FIG. 5 depicts a procedure 70 for converting from a block number to a sector number. In a system which involves incorporating the diverse data structure as well as the same data structure as the magnetic disk storage system 20, step 71 selects whether a conversion is needed. If it is, step 72 divides the block number by the number of blocks per sector. For the disk, the divisor is 8 as there are 8 disk data blocks in a sector; for a corresponding host block the divisor is also 8. If, on the other hand, the host block size equals a sector size, then the divisor is 1. In the system dividing by 8 merely requires the disk block number in binary form three positions to the right.

Figure 6:
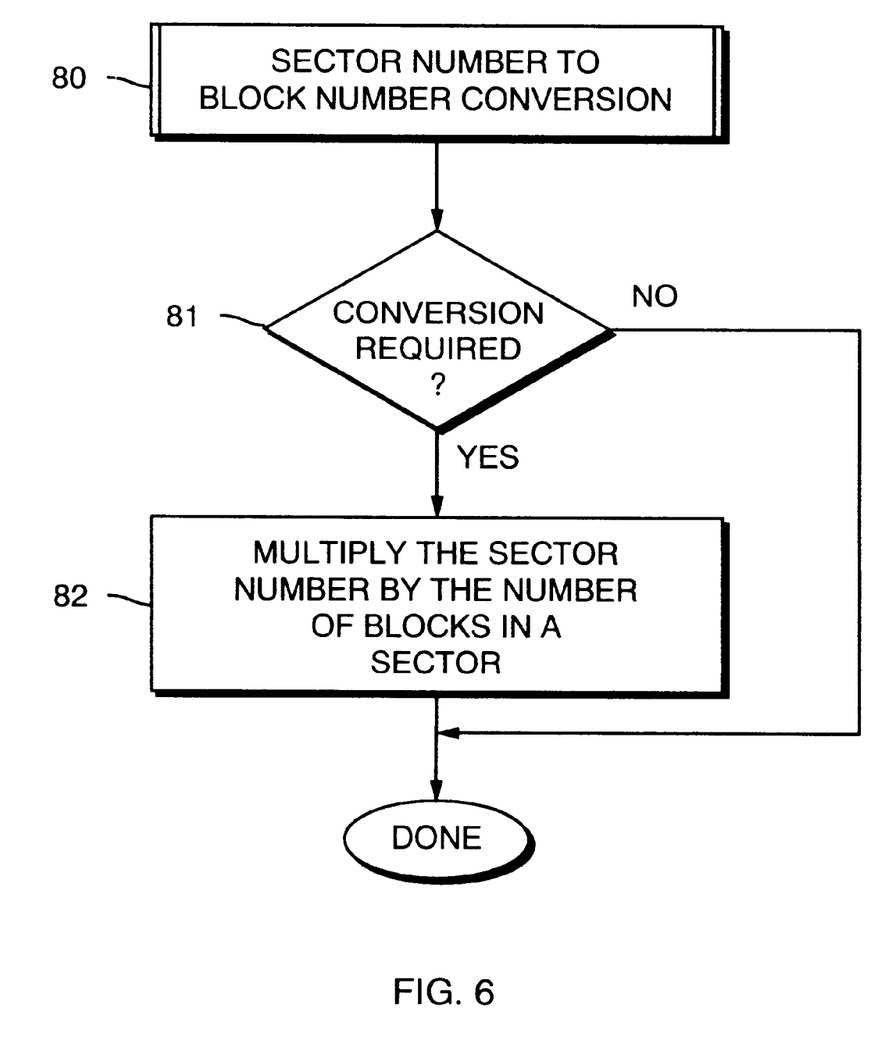
FIG. 6 is a diagram for a method for converting a disk sector number to a host block number.

FIG. 6 depicts a similar procedure 80 by which a sector number is converted to a block number. If a conversion is required, step 81 transfers operations to step 82 wherein the disk sector number is multiplied by the number of disk blocks in a disk sector. Again, this can be accomplished merely by shifting the disk sector number three bit positions to the left.

Therefore in accordance with the various objects of this invention, the system and method disclosed with respect to FIGS. 1 through 6 enables a magnetic disk storage device, such as the device 20 shown in FIG. 1, having a predetermined data structure to operate with hosts having the same data structure and diverse data structures. This capability allows a host that operates with a diverse data structure to obtain the cost benefits of obtaining a magnetic disk storage device that has wide application and therefore typically will be less expensive to purchase. Moreover, this benefit is derived without the customer having to invest in modification of application programs to accommodate the differences in the data structures of the host and magnetic disk storage system.

This invention has been described with respect to a particular application, including specific data structures in which the host block size is greater than the disk block size. It will be apparent to those of ordinary skill in the art the invention can be applied to other specific data structures wherein the disk block size is larger that the host block size. Moreover it will be apparent to those of ordinary skill in the art to alter the various procedures in order to optimize the operation of such a system.

The above and further modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for processing input-output requests for data in a data processing system including a magnetic disk data storage device that stores data in fixed-length disk blocks of a first plurality of data bytes and a host that generates input-output requests for data using fixed-length host blocks of a second, non-integer multiple of data bytes, said method comprising the steps of:

A) defining a buffer intermediate the host system and the magnetic disk data storage device, said buffer having a size that is at least the size of the larger of the host and disk blocks, B) establishing a correspondence between the sizes of the host and disk blocks, C) transferring data between the host and buffer in blocks corresponding to the size of the host blocks, and D) transferring data between the magnetic disk data storage device and the buffer as a number of disk blocks wherein the number of disk blocks transferred between the buffer and the magnetic disk data storage device is determined by the number of host blocks identified in the host input-output request and the correspondence in the host and disk block sizes.

2. A method as recited in claim 1 wherein said buffer defining step produces a buffer having a capacity for an integer number of data bytes that exceeds the number of data bytes in the larger of the host and disk blocks.

3. A method as recited in claim 2 wherein said buffer stores information for transfer to the data storage device in addition to the data bytes.

4. A method as recited in claim 3 wherein the host blocks are constituted by a greater number of data bytes than a disk block and wherein the disk blocks for storing a single host block constitute a set of sequential disk blocks and wherein the additional information includes CRC data, said method comprising the additional step of storing the CRC data on the disk at the end of each set of disk blocks.

5. A method as recited in claim 4 wherein said step of transferring host blocks between the host and the buffer includes calculating the CRC data for each host block and wherein the step of transferring disk blocks between the buffer and the data storage device includes checking the CRC data and generating a disk sector number.

6. A method as recited in claim 1 wherein the data storage device stores a predetermined number of disk blocks in a group of sequential locations and wherein said transfer between the host and the buffer includes the step of converting between host and disk block numbers.

7. A method for enabling the transfer of data between a magnetic disk storage device having a disk block size of a fixed length and a host that issues input-output requests including reference to host blocks of another, larger fixed length that is a non-integer multiple of the disk block size, said method comprising the steps of:

A) defining in a cache memory a buffer having a size that is at least the size of a host block for storing a set of an integer number of disk blocks whereby the set of the disk blocks is capable of storing a host block, B) processing, in a host adapter connected to the host and the cache memory, input-output requests from the host by transferring each such request to the cache memory and by transferring corresponding data in host blocks between the host and the buffer, and C) processing, in a disk adapter, input-output requests in the cache memory by transferring corresponding sets of disk blocks between the buffer and the magnetic disk storage device.

8. A method as recited in claim 7 wherein an input-output request includes a host block number that identifies each host block and wherein said host adapter processing of input-output requests includes the step of translating between host block numbers and disk block numbers.

9. A method as recited in claim 7 wherein the input-output requests include read and write requests and wherein said host adapter processing of a write request from the host includes the step of calculating a CRC code for each host block, said disk adapter processing including storing the CRC code in the magnetic disk storage device.

10. A method as recited in claim 8 wherein each host block includes $2088_{10}$ bytes of data and each disk block includes $512_{10}$ bytes of data and wherein said host adapter processing of a write request includes:

i) transferring a host block into the buffer in contiguous locations, ii) transferring the input-output request into the cache memory, iii) generating a CRC code for the host data block, and iv) appending the CRC code to the data of the host data block in the buffer.

11. A method as recited in claim 10 wherein the magnetic disk storage device addresses storage locations therein by disk sector number and wherein said disk adapter processing in response to a write request includes:

i) decoding the write request stored in the cache memory, ii) calculating a disk sector number from the disk block number, iii) transferring the host block, including the data, CRC code a disk sector number, from the buffer to the magnetic disk storage device as a sequence of disk blocks, and iv) acknowledging the completion of the writing operation.

12. A method as recited in claim 8 wherein each host block includes $2088_{10}$ bytes of data and each disk block includes $512_{10}$ bytes of data and wherein said host adapter processing of a read request includes:

i) transferring the read request into the cache memory, and ii) retrieving from the buffer as a host block only the data designated by the read request.

13. A method as recited in claim 12 wherein said disk adapter processing in response to a read request includes:

i) determining the need for accessing the magnetic disk storage device in response to the read request, ii) decoding the read request in the cache memory, iii) transferring from the magnetic disk storage device to the buffer five disk consecutive blocks that include the data for the corresponding host block and CRC code, and iv) acknowledging the completion of the reading operation.

14. Apparatus for processing input-output requests for data in a data processing system including a magnetic disk data storage device that stores data in fixed-length disk blocks of a first plurality of data bytes and a host generates input-output requests for data using fixed-length host blocks of a second, non-integer multiple of data bytes, said apparatus comprising:

A) a buffer intermediate the host system and the data storage device, said buffer having a size that is at least the size of the larger of the host and disk blocks, B) a correspondency that establishes the correspondence between the sizes of the host and disk blocks, C) means for transferring data between the host and buffer in blocks corresponding to the size of the host blocks, and D) means for transferring data between the magnetic disk data storage device and the buffer as a number of disk blocks wherein the number of disk blocks transferred between the buffer and the magnetic disk data storage device is determined by the number of host blocks identified in the host input-output request and the host and disk block sizes in said correspondency.

15. Apparatus as recited in claim 14 wherein said buffer has a capacity for an integer number of data bytes that exceeds the number of data bytes in the larger of the host and disk blocks.

16. Apparatus as recited in claim 15 wherein said buffer includes a first section for storing data from the larger of the host and data blocks and a second section for additional data bytes.

17. Apparatus as recited in claim 16 wherein the host blocks are constituted by a greater number of data byes than a disk block and the disk data blocks for storing a single host block constitute a set of sequential disk blocks and wherein the additional information includes CRC data, said apparatus additionally comprising means for storing the CRC data on the disk at the end of each set of disk blocks.

18. Apparatus as recited in claim 17 wherein said means for transferring host blocks between the host and the buffer includes means for calculating the CRC data for each host block and wherein said means for transferring disk blocks between the buffer and the data storage device includes means for checking the CRC data and calculating a disk sector number.

19. Apparatus as recited in claim 14 wherein the data storage device stores a predetermined number of disk blocks in a group of sequential locations and wherein said means for transferring between the host and the buffer includes means for converting between host and disk block numbers.

20. A magnetic disk storage device having a disk block size of a fixed length for connection to a host that issues input-output requests including reference to host blocks of a larger fixed length that is a non-integer multiple of the disk block size, said device comprising:

A) a buffer in a cache memory, said buffer having a size that is at least the size of a host block for storing a set of an integer number of disk blocks whereby a set of the disk blocks is capable of storing a host block, B) a host adapter connected to the host and the cache memory, said host adapter having a control for responding to input-output requests from the host by transferring an input-output request to said cache memory and by transferring corresponding data in host blocks between the host and said buffer, and C) a disk adapter connected to the cache memory and magnetic disk storage device, said disk adapter having a control for responding to input-output requests in said buffer by transferring corresponding sets of disk blocks between buffer and the magnetic disk storage device.

21. A magnetic disk storage device as recited in claim 20 wherein an input-output request includes a host block number that identifies each host block and wherein said host adapter includes means for translating between host block numbers and disk block numbers.

22. A magnetic disk storage device as recited in claim 21 wherein the input-output requests include read and write requests and wherein said host adapter includes means responsive to a write request for calculating a CRC code for each host block, said disk adapter storing the CRC code in the magnetic disk storage device.

23. A magnetic disk storage device as recited in claim 21 wherein each host block includes $2088_{10}$ bytes of data and each disk block includes $512_{10}$ bytes of data and wherein said host adapter comprises:

i) means for transferring a host block into the buffer in contiguous locations, ii) means for transferring the input-output request into the cache memory, iii) means for calculating a CRC code for the host data block, and iv) means for appending the CRC code to the data of the host data block in the buffer.

24. A magnetic disk storage device as recited in claim 23 wherein the magnetic disk storage devices addresses storage locations therein by disk sector numbers and wherein said disk adapter comprises:

i) means for decoding a write request stored in the cache memory, ii) means for calculating a disk sector number from a disk block number, iii) means for transferring the host block, including the data, CRC code and disk sector number, from the buffer to the magnetic disk storage device as a sequence of disk blocks, and iv) means for acknowledging the completion of the writing operation.

25. A magnetic disk storage device as recited in claim 21 wherein each host block includes $2088_{10}$ bytes of data and each disk block includes $512_{10}$ bytes of data and wherein said host adapter is adapted for processing a read request and comprises:

i) means for transferring the read request into the cache memory, and ii) means for retrieving from the buffer as a host block only the data designated by the read request.

26. A magnetic disk storage device as recited in claim 25 wherein said disk adapter processing additionally comprises:

i) means for determining the need for accessing the magnetic disk storage device in response to the read request, ii) means for decoding the read request in the cache memory, iii) means for transferring from the magnetic disk storage device to the buffer five consecutive disk blocks that include the data for the corresponding host block and CRC code, and iv) means for acknowledging the completion of the reading operation.

* * * * *